（12）United States Patent
Coleman et al.

(10) Patent No.: US 10,599,423 B2
(45) Date of Patent: Mar. 24, 2020

(54) SOURCE CODE MANAGEMENT FOR A MULTI-TENANT PLATFORM-AS-A-SERVICE (PAAS) SYSTEM

(71) Applicant: Red Hat, Inc., Raleigh, NC (US)

(72) Inventors: Clayton Coleman, Raleigh, NC (US); Daniel McPherson, Westford, MA (US); Krishna Raman, Union City, CA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/548,873

(22) Filed: Nov. 20, 2014

(65) Prior Publication Data
US 2016/0147529 A1    May 26, 2016

(51) Int. Cl.
*G06F 8/71*    (2018.01)
*G06F 8/61*    (2018.01)
*G06F 9/455*   (2018.01)

(52) U.S. Cl.
CPC ............... *G06F 8/71* (2013.01); *G06F 8/63* (2013.01); *G06F 9/45558* (2013.01); *G06F 2009/45562* (2013.01)

(58) Field of Classification Search
CPC ........................................................ G06F 8/71
USPC ........................................................ 717/120
See application file for complete search history.

(56) References Cited

U.S. PATENT DOCUMENTS

| 7,577,482 B1 * | 8/2009 | Steele ............. G05B 19/042 700/19 |
| 7,680,932 B2 | 3/2010 | Defaix et al. |
| 8,683,430 B2 | 3/2014 | Gonzales et al. |
| 2003/0056207 A1 * | 3/2003 | Fischer .................. G06F 8/60 717/174 |
| 2005/0015762 A1 | 1/2005 | Steckler et al. |
| 2005/0154734 A1 * | 7/2005 | Zucchini ............. G06F 11/1461 |
| 2010/0050156 A1 * | 2/2010 | Bonanno ................ G06F 8/443 717/122 |

(Continued)

OTHER PUBLICATIONS

Lars Vogel, "Git—Tutorial" Version 5.6, Aug. 2, 2014, http://www.vogella.com/tutorials/Git/article.html.

(Continued)

*Primary Examiner* — Chat C Do
*Assistant Examiner* — Bradford F Wheaton
(74) *Attorney, Agent, or Firm* — Lowenstein Sandler LLP

(57) ABSTRACT

Aspects of the disclosure provide for source code management for a multi-tenant Platform-as-Service (PaaS) system. A method of the disclosure includes creating, by a processing device of a platform-as-a-service (PaaS) system, a first container to host a first source code management repository for an application; receiving, at the first container, source code associated with the application; creating, by the processing device, a second container to provide deployment functionality for the application, the second container comprising resource-constrained processing space of a node of the PaaS system to execute functionality of the application; and deploying, by the processing device, the source code on the PaaS system using the second container. Aspects of the disclosure may be implemented using high-availability (HA) clusters by replicating the SCM container(s). Aspects of the disclosure may provide users with cost-effective, scaled, and secure PaaS services using reduced infrastructure.

15 Claims, 6 Drawing Sheets

(56) References Cited

U.S. PATENT DOCUMENTS

| | | | |
|---|---|---|---|
| 2010/0131940 A1 | 5/2010 | Jazdzewski | |
| 2011/0138374 A1* | 6/2011 | Pal | G06F 8/656 |
| | | | 717/169 |
| 2011/0252401 A1* | 10/2011 | Charisius | G06F 8/20 |
| | | | 717/110 |
| 2012/0144378 A1 | 6/2012 | Shah | |
| 2014/0075432 A1* | 3/2014 | McGrath | G06F 9/455 |
| | | | 718/1 |
| 2014/0282457 A1* | 9/2014 | Chow | G06F 8/54 |
| | | | 717/164 |
| 2015/0012962 A1* | 1/2015 | Walsh | H04L 63/20 |
| | | | 726/1 |

OTHER PUBLICATIONS

Skaz; "Git Server Like GitHub? [closed]", Mar. 31, 2011; http://stackoverflow.com/questions/5507489/git-server-like-github.

"What is CollabNet GitEye?"; Aug. 27, 2014; http://www.collab.net/giteyeapp.

Nik van der Ploeg, "How to Set Up GitLab as Your Very Own Private GitHub Clone", Aug. 23, 2013; https://www.digitalocean.com/community/tutorials/how-to-set-up-gitlab-as-your-very-own-private-github-clone.

"Gems from Git Repositories"; Aug. 27, 2014; http://bundler.io/git.html.

\* cited by examiner

400

START

↓

Receive a request to deploy source code of an application on a PaaS system
410

↓

Create a first container to host a remote source code management repository for the application
420

↓

Create a second container to provide deployment functionality or any other functionality for the application
430

↓

Implement deployment functionality to convert the source code into a build result prepared for distribution as a deployment artifact
441

↓

Create a third container to host the source code in view of the deployment artifact
443

↓

Remove the second container
445

Deploy the source code on the PaaS system 440

↓

END

START

Receive an indication that a source code management (SCM) platform has been designated by a user to host a remote SCM repository for an application running on a PaaS system
510

Associate the remote SCM repository and/or the SCM platform with the application
520

Receive a request to deploy source code of the application on the PaaS system
530

Deploy the source code (See, e.g., blocks 441-445 of FIG. 4)
540

END

*Figure 5*

SOURCE CODE MANAGEMENT FOR A MULTI-TENANT PLATFORM-AS-A-SERVICE (PAAS) SYSTEM

TECHNICAL FIELD

The aspects of the disclosure relate generally to platform-as-a-service (PaaS) environments and, more specifically, relate to source code management for a multi-tenant PaaS system.

BACKGROUND

Currently, a variety of Platform-as-a-Service (PaaS) offerings exists that include software and/or hardware facilities for facilitating the execution of web applications in a cloud-computing environment (the "cloud"). Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicates with the executing program from remote geographic locations using Internet protocols.

PaaS offerings typically facilitate deployment of web applications without the cost and complexity of buying and managing the underlying hardware and software and provisioning hosting capabilities, providing the facilities to support the complete life cycle of building and delivering web application and service entirely available from the Internet. Typically, these facilities operate as one or more virtual machines (VMs) running on top of a hypervisor in a host server.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for ex-planation and understanding only.

FIG. 4 is a flow diagram illustrating a method for source code management for a multi-tenant PaaS system utilizing a container to host a remote source code management repository according to an embodiment of the disclosure;

FIG. 5 is a flow diagram illustrating a method for source code management for a multi-tenant PaaS system utilizing a source management platform according to an embodiment of the disclosure.

DETAILED DESCRIPTION

Figure 1:
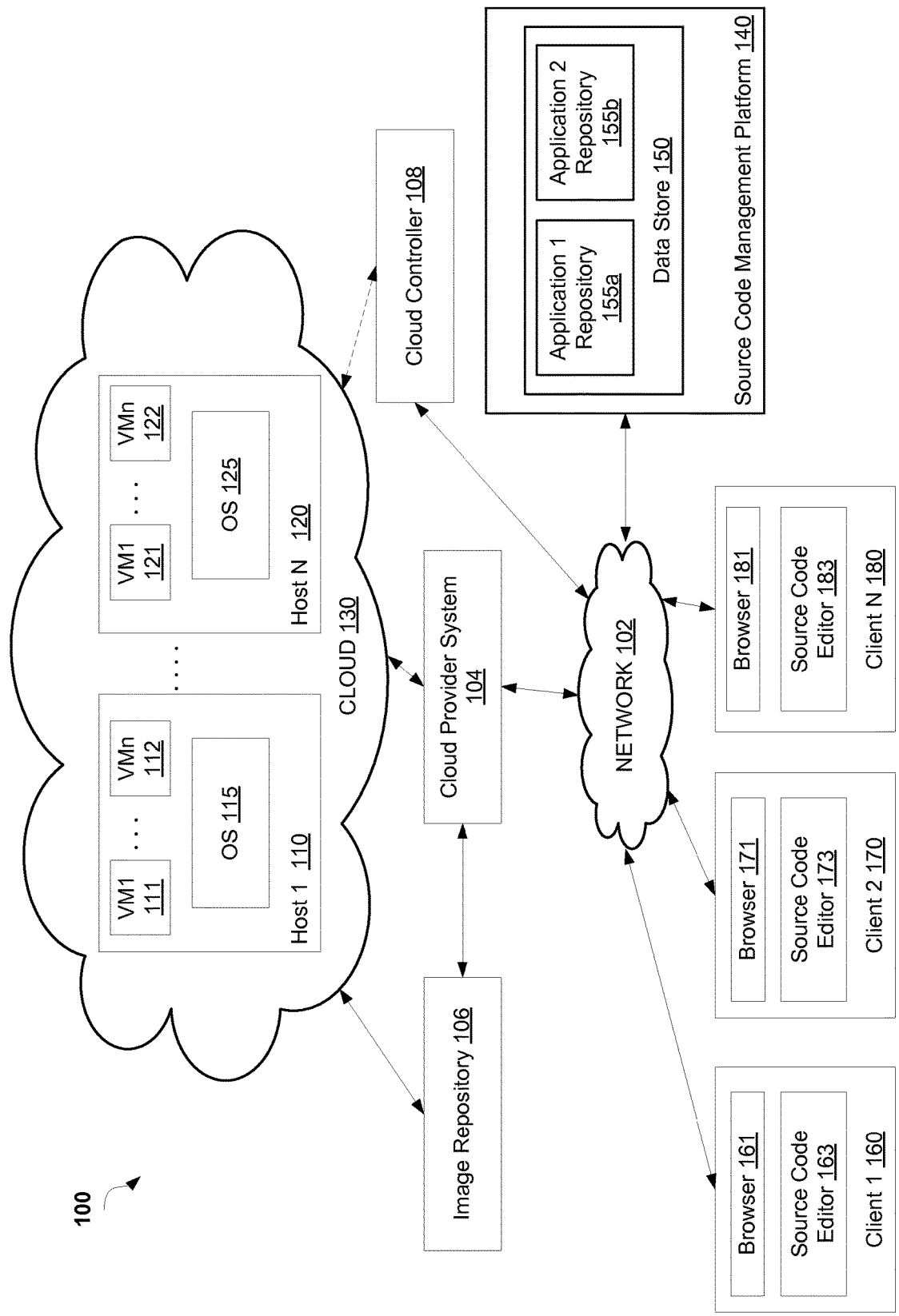
FIG. 1 is a block diagram of a network architecture in which embodiments of the disclosure may operate.

Aspects of the disclosure provide for source code management for a multi-tenant Platform-as-a-Service (PaaS) system. Aspects of the disclosure host a remote source code management (SCM) repository for an application running on the PaaS outside of a container and/or a node (e.g., a VM) that hosts a framework or other functionality of the application. A container may refer to a resource-constrained process space of a host (e.g., a node such as virtual machine (VM) or physical machine) that can execute functionality of an application. For example, embodiments of the disclosure can create one or more containers to host a framework or provide other functionality (e.g., deployment functionality, database functionality, etc.) of the application (also referred to herein as "application containers"). Additionally, embodiments of the disclosure create one or more containers to host a remote SCM repository for the application (also referred to herein as "SCM containers"). In one example, the application container(s) and the SCM container(s) can be resident on multiple nodes (e.g., VMs) of the PaaS system. As another example, embodiments of the disclosure cause a remote SCM repository for an application running on the PaaS system to be hosted by a source code management platform that is external to the PaaS system.

In some implementations of the disclosure, upon receiving source code of the application provided (e.g., "pushed") by a local SCM repository hosted by a client, a remote SCM repository (e.g., a remote SCM repository hosted by the SCM container or the external source code management platform) can call into an application container (e.g., a gear) that hosts deployment functionality for the application to invoke a build logic and/or a deployment logic to build, prepare and/or distribute the source code and resulting binaries. For example, the pushed source code may trigger a deployment component of the application to implement build, preparation, and distribution functionality to convert the source code into a build result prepared for distribution as a deployment artifact on the PaaS. In some embodiments, the deployment artifact is a deployable image that is generated by creating and committing an image from the source code and a base image. The deployment artifact can then be instantiated as one or more new containers. Upon creating and/or starting the new container(s) from the image, embodiments of the disclosure may remove the previous application container(s) that have been created to host old source code for the application (also referred to herein as "old application container(s)").

Aspects of the disclosure may be implemented using high-availability (HA) clusters by replicating the SCM container(s). One or more remote SCM repositories that are external to the PaaS system can be implemented for the application since the remote repositories are separated from the application containers.

Aspects of the disclosure can host a remote SCM repository for an application running on a PaaS system outside of the containers that hosts functionality of the application without utilizing special SCM servers. As such, embodiments of the disclosure can provide users with cost-effective and secure PaaS services using reduced infrastructure.

Embodiments of the disclosure also provide improved schemes for deploying and monitoring an application on a PaaS by implementing SCM repositories and other components of the application using similar mechanisms (e.g., containers).

In one implementation of the disclosure, a method of the disclosure includes creating, by a processing device of a platform-as-a-service (PaaS) system, a first container to host a first source code management repository for an application, the first container comprising resource constrained processing space of a first node of the PaaS system to execute functionality of the application; receiving, at the first container, a first source code associated with the application; creating, by the processing device, a second container to provide deployment functionality for the application, the second container comprising resource-constrained processing space of a second node of the PaaS system to execute functionality of the application; and deploying, by the processing device, the first source code on the PaaS system using the second container.

FIG. 1 is a block diagram of a network architecture 100 in which embodiments of the disclosure may operate. The network architecture 100 includes a cloud 130 managed by a cloud provider system 104. The cloud provider system 104 provides VMs, such as VMs 111, 112, 121, and 122 hosted in cloud 130. Each VM is hosted on a physical machine, such as host 1 110 through host N 120, configured as part of the cloud 130. In some embodiments, the host machines 110, 120 are often located in a data center. For example, VMs 111 and 112 are hosted on physical machine 110 in cloud 130 provided by cloud provider 104.

Each client 160, 170, 180 may be any type of computing device, for example, a device including a processor, a computer-readable medium, and a memory. Each client 160, 170, 180 may be, for example, a mobile device, a PDA, a laptop, a desktop computer, or any other computing device.

In one embodiment, each client 160, 170, 180 may be executing a browser application 161, 171, 181 or any other application adapted to communicate over Internet related protocols (e.g., TCP/IP and HTTP) and/or display a user interface. In one embodiment, users can interact with applications executing on the cloud-based VMs 111, 112, 121, 122 using clients 160, 170, and 180, via corresponding web browser applications 161, 171, and 181.

In one embodiment, each client 160, 170, 180 can include a source code editor application 163, 173, 183 ("editor") that can be used to edit source code of computer programs. An end user of client 160, 170, 180 may use editor 163, 173, 183 to make and submit code changes to source code of an application for a PaaS system (e.g., a PaaS system as described below in connection with FIGS. 2 and 3). In one embodiment, as described below, the source code is provided to a source code management platform 140. In another embodiment, the source code is provided to one or more VMs 111, 112, 121, and 122.

Clients 160, 170, and 180 are connected to hosts 110, 120 and the cloud provider system 104 via a network 102, which may be a private network (e.g., a local area network (LAN), a wide area network (WAN), intranet, or other similar private networks) or a public network (e.g., the Internet). Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In some embodiments, cloud controller 108 receives commands from PaaS provider controller 140. Based on these commands, the cloud controller 108 provides data (e.g., such as pre-generated images) associated with different applications to the cloud provider system 104. In some embodiments, the data may be provided to the cloud provider 104 and stored in an image repository 106, in an image repository (not shown) located on each host 110, 120, or in an image repository (not shown) located on each VM 111, 112, 121, 122.

Upon receiving a command identifying specific data (e.g., application data and files used to initialize an application on the cloud), the cloud provider 104 retrieves the corresponding data from the image repository 106, creates an instance of it, and loads it to the host 110, 120 to run on top of a hypervisor (not shown) as a VM 111, 112, 121, 122 or within a VM 111, 112, 121, 122. In addition, a command may identify specific data to be executed on one or more of the VMs 111, 112, 121, and 122. The command may be received from the cloud controller 108, from a PaaS provider controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based discs, solid-state-drives (SSDs) or hard drives.

In one embodiment, architecture 100 includes a source code management (SCM) platform 140. The SCM platform 140 can be implemented on one or more computing devices, such as server devices, desktop computers, laptop computers, mobile devices, etc. In one embodiment, the SCM platform 140 hosts one or more repositories 155a-155b for applications. The repositories 155a-155b may be stored in a data store 150 of the source code management platform 140. In one embodiment, the applications associated with the repositories 155a-155b may be applications running on a PaaS system (e.g., a PaaS system as described below in connection with FIG. 2 and/or FIG. 3). For example, each repository 155a, 155b may include software code implemented via computer-readable instructions that provide one or more containers to be executed by the PaaS system. Each repository 155a, 155b may include components of a certain application or a portion of the application.

In one embodiment, the data store 150 implements a source code management system, sometimes referred as "SCM" or revision control system. One example of such an SCM or revision control system is Git, available as open source software. Another example of such an SCM or revision control system is Binary, available as open source software. Git, Binary, and other such distributed SCM systems, usually include a working directory for making changes, and a local software repository for storing the changes. The packaged software application can then be "pushed" from the local SCM repository to a remote SCM repository. In one embodiment of the disclosure, the SCM platform 140 hosts one or more remote repositories for one or more applications running on the VM 111, 112, 121, 122, so that the source code of the applications may be edited by others with access, or the application may be executed by the VM 111, 112, 121, 122. In another embodiment, one or more VMs 111, 112, 121, and 122 may host one or more remote repositories for one or more applications running on the VM 111, 112, 121, 122.

While various embodiments are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122. In some embodiments, an environment other than a virtual machine (VM) may be used to execute functionality of PaaS applications. As such, in some embodiments, a "node" providing computing functionality may provide the execution environment for an application of the PaaS system. The "node" may refer to a VM or any other type of computing environment.

Figure 2:
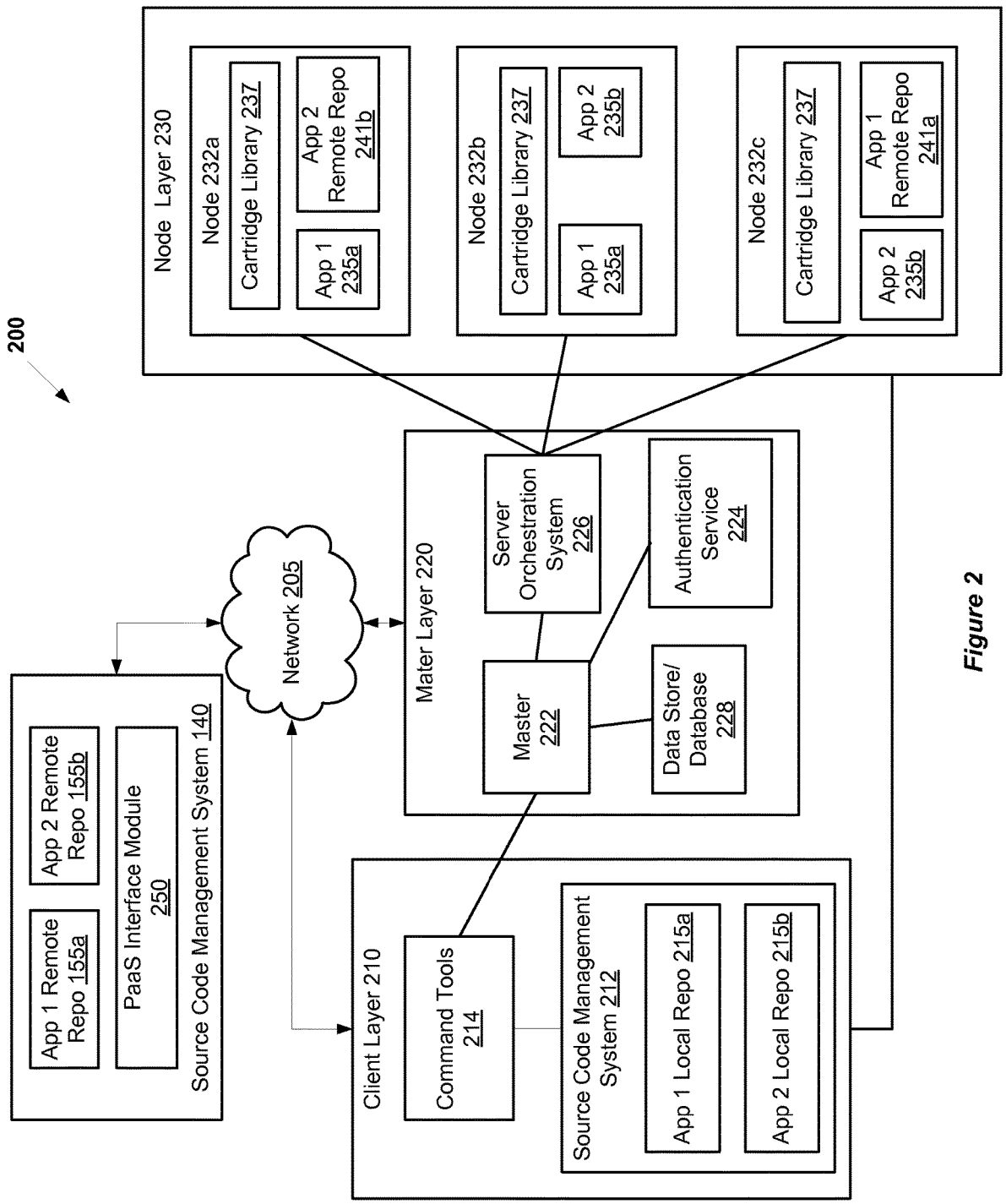
FIG. 2 is a block diagram of a PaaS system architecture according to an embodiment of the disclosure.

FIG. 2 is a block diagram of a PaaS system architecture 200 according to an embodiment of the disclosure. The PaaS architecture 200 allows users to launch software applications in a cloud computing environment, such as cloud computing environment provided in network architecture 100 described with respect to FIG. 1. The PaaS system architecture 200, in one embodiment, includes a client layer 210, a master layer 220, and a node layer 230.

In one embodiment, the components of the PaaS system architecture are in communication, via network 205, with a PaaS interface module 250 of the source code management platform 140. Network 205 may include, for example, the Internet in one embodiment. In other embodiments, other networks, wired and wireless, such as an intranet, local area network (LAN), wide area network (WAN), or broadcast network may be used.

In one embodiment, the client layer 210 resides on a client machine, such as a workstation of a software developer, and provides an interface to a user of the client machine to a master layer 220 of the PaaS system 200. In one embodiment, the client machine can be a client 160, 170, 180 described with respect to FIG. 1. The master layer 220 may facilitate the creation and deployment on the cloud (via node layer 230) of software applications being developed by an end user at client layer 210.

In one embodiment, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository 215a, 215b, for storing the changes for each application associated with the end user of the PaaS system 200. Another example of such an SCM or revision control system is Binary, available as open source software. Binary, and other such distributed SCM systems, usually include a working directory for making changes, and a local software repository 215a, 215b, for storing the changes for each application associated with the end user of the PaaS system 200.

The packaged software application can then be provided (e.g., "pushed") from the local SCM repository 215a, 215b to a corresponding remote SCM repository. For example, source code of application 235a-b (e.g., source code of a new application, changes to source code of an application, etc.) can be provided (e.g., "pushed") from the local SCM repository 215a, 215b to a remote SCM repository 241a-b hosted by the node(s) 232a, 232c. In another example, source code of the application 235a-b can be provided (e.g., "pushed") from the local SCM repository 215a, 215b to a remote SCM repository 155a-b hosted by the SCM platform 140. From the remote SCM repository 241a-b, 155a-b, source code of the application 235a-b may be edited by others with access, or the application may be executed by a machine. Other SCM systems work in a similar manner.

The client layer 210, in one embodiment, also includes a set of command tools 214 that a user can utilize to create, launch, and manage applications. In one embodiment, the command tools 214 can be downloaded and installed on the user's client machine, and can be accessed via a command line interface or a graphical user interface, or some other type of interface. In one embodiment, the command tools 214 expose an application programming interface ("API") of the master layer 220 and perform other applications management tasks in an automated fashion using other interfaces, as will be described in more detail further below in accordance with some embodiments.

In one embodiment, the master layer 220 acts as middleware between the client layer 210 and the node layer 230. The node layer 230 includes the nodes 232a-c on which applications 235a-b are provisioned and executed. In one embodiment, each node 232a-c is a VM. In some embodiments, the VMs are provisioned by an Infrastructure as a Service (IaaS) provider. In other embodiments, the nodes 232a-c may be physical machines or VMs residing on a single physical machine. In one embodiment, the master layer 220 is implemented on one or more machines, such as server computers, desktop computers, etc. In some embodiments, the master layer 220 may be implemented on one or more machines separate from machines implementing each of the client layer 210 and the node layer 230, or may implemented together with the client layer 210 and/or the node layer 230 on one or more machines, or some combination of the above.

In one embodiment, the master layer 220 includes a master 222 that coordinates requests from the client layer 210 with actions to be performed at the node layer 230. Examples of the requests can include a request to create an application, a request to perform an action on a container (e.g., creating, removing, and/or managing a container), a request to deploy source code of an application, a request to designate a system to host a remote SCM repository (e.g., an indication that a system has been designated by a user to host a remote SCM repository), etc.

In one embodiment, a user, using the command tools 214 at client layer 210, can request the creation of a new application 235a-b, deployment of source code of the application 235a-b, the designation of a system that hosts a remote SCM repository, etc. In response to receiving such a request, the master 222 may first authenticate the user using an authentication service 224. In one embodiment, the authentication service may comprise custom authentication methods, or standard protocols such as SAML, Oauth, etc. Once the user has been authenticated and allowed access to the system by authentication service 224, the master 222 uses a server orchestration system 226 to collect information and configuration information about the nodes 232a-c.

In one embodiment, the master 222 uses the ETCD™ framework available from CoreOS™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232a-c, which are acting as application servers and web servers.

For example, if the master 222 wanted to shut down all applications 235a-b on all even numbered nodes out of 100,000 nodes, the master 222 may provide one command to the server orchestration system 226. Then, the server orchestration system 226 generates and distributes a message to all nodes 232a-c to shut down all applications 235a-b if the node 232a-c is even, using a messaging and queuing system. Thus, in one embodiment, the master 222 manages the business logic and model representing the nodes 232a-c and the applications 235a-b residing on the nodes, and acts as a controller that generates the actions requested by users via an API of the client tools 214. The server orchestration system 226 then takes the actions generated by the master 222 and orchestrates their execution on the many nodes 232a-c managed by the system.

In one embodiment, the information collected about the nodes 232a-c can be stored in a data store 228. In one embodiment, the data store 228 can be a locally-hosted database or file store, or it can be a cloud-based storage service provided by a Software-as-a-Service (SaaS) provider. The master 222 uses the information about the nodes 232a-c and their applications 235a-b to model the application hosting service and to maintain records about the nodes. In one embodiment, data of a node 232a-c is stored in the form of a JavaScript Object Notation (JSON) blob or string that maintains key-value pairs to associate a unique identifier, a hostname, a list of applications, and other such attributes with the node.

In embodiments of the disclosure, the PaaS system architecture 200 of FIG. 2 is a multi-tenant PaaS environment. In a multi-tenant PaaS environment, each node 232a-c runs multiple applications 235a-b that may be owned or managed by different users and/or organizations. As such, a first customer's deployed applications 235a-b may co-exist with any other customer's deployed applications on the same node 232 (VM) that is hosting the first customer's deployed applications 235a-b. In some embodiments, portions of an application are running on multiple different nodes 232a-c. For example, as shown in FIG. 2, components of application 1 235a run in both node 232a and node 232b. Similarly, components of application 2 235b may run in node 232b and node 232c.

In addition, each node also maintains a cartridge library 237. The cartridge library 237 maintains multiple software components (referred to herein as cartridges) that may be utilized by applications 235a-b deployed on node 232a-c. A cartridge can represent a form of support software (or middleware) providing the functionality (e.g., configuration templates, scripts, dependencies, etc.) needed to run an application 235a-b and/or add a feature to an application 235a-b. In one embodiment, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance of a cartridge from cartridge library 237 to an application 235a-b provides a capability for the application 235a-b, without the customer who owns the application having to administer or update the included capability.

As discussed above, a remote SCM repository (e.g., the remote SCM repository 241a, 241b, 155a, 155b) corresponding to the local repository 215a-b can be hosted by the node layer 230, the source code management platform 140, and/or any other suitable system that can host a remote SCM repository. In some embodiments, the master layer 220 can allow an end user of the PaaS system 200 to designate one or more systems to host a remote SCM repository for executing and/or editing an application on the node 232a-c (e.g., the application 235a-b). For example, master layer 220 may cause one or more graphical user interfaces (GUIs) to be presented to the end user to prompt the end user to designate one or more systems to host a remote SCM repository. In some embodiments, the graphical user interfaces can be presented using a browser application, such as the browser 161, 171, 181 as described above in connection with FIG. 1. As another example, an end user of the client layer 210 can designate a system to host a remote SCM repository and/or the remote SCM repository via the command tools 214.

In one embodiment, the end user can be prompted to select one or more systems from a list of systems that can host a remote SCM repository for an application that is run on the node 232a-c. Additionally or alternatively, the end user can designate one or more systems to host a remote SCM repository for the application by providing identifying information of the system(s). Examples of the identifying information can include a uniform resource locator (URL) associated with the system(s) and/or a remote SCM repository hosted by the system(s), a domain name of the system (s), etc.

In some embodiments, the end user designates the node layer 230 to host a remote SCM repository for an application running on one or more nodes 232a, 232b, and 232c. In response to receiving such a designation, the client layer 210 can send to the master layer 220 an indication that the node layer 230 is designated as a system that hosts a remote SCM repository. In some embodiments, the indication can include identifying information of the node layer 230 and/or any other suitable information related to the designation. In some embodiments, the indication can be sent via command line tools and/or by communicating directly with application interface (API) of the master 222 as discussed above.

In response to receiving the indication, the master layer 220 can cause a remote SCM repository to be created for the application. For example, a remote repository 241a-241b can be created for the application 235a-235b. In one embodiment, the application 241a and its corresponding remote repository 241a can reside on multiple nodes (e.g., node 232a and node 232c as shown in FIG. 2). In one embodiment, a copy of the remote repository 241a, 241b can be stored in the local SCM repository 215a, 215b. In some embodiments, the remote repositories 241a-b can be created as described further below in connection with FIG. 3.

In some embodiments, an end user of the PaaS system 200 may designate a source code management platform (e.g., the SCM platform 140) to host a remote SCM repository (also referred to herein as "remote repository") for executing and/or editing an application on the node 232a-c. For example, the end user may make such a designation by providing identifying information of the SCM platform 140 and/or the remote SCM repository 155a-b (e.g., a URL). In response to receiving such a designation, the client layer 210 can send an indication of the designation to the master layer 220 (e.g., via an application programming interface (API) such as a representational state transfer (REST) API).

In one embodiment, in response to receiving the indication, the master layer 220 can associate the designated remote repository with the application. For example, the identifying information associated with the remote repository 155a-b and/or the SCM management platform 140 can be stored in association with other information about the application 235a-b in the data store 228. As another example, the master layer 220 can cause a post-receive hook to be set up at the remote SCM repository 155a-b. In one embodiment, the post-receive hook can invoke one or more containers (e.g., gears) hosting deployment functionality for the application 235a-b (e.g., via a URL associated with the container(s)) to build, prepare, and/or distribute the source code for deployment on the PaaS system (e.g., by kicking off a build logic and/or a deployment logic via one or more API calls).

In one embodiment, the end user can make and submit source code (e.g., source code of a new application, changes to source code of a running application, etc.) of the application 235a-b (e.g., using the source code editor 163, 173, 183 of FIG. 1). The client layer 210 can then provide the source code to the source code management platform 140 that hosts the remote SCM repository 155a-b. For example, upon receiving the application code, the local SCM repository 215a-b can provide the application code to the remote SCM repository 155a-b that has been associated with the application 235a-b via a "push" operation.

In some embodiments, upon receiving the source code at the remote SCM repository 155a-b, the SCM platform 140 can update the remote SCM repository 155a-b in view of the received source code and invoke the received source code to be deployed on the PaaS system. In one embodiment, as discussed above, a post-receive hook can be set up on the remote SCM repository 155a-b that calls into one or more of the containers that implement deployment functionality for the application to deploy the source code on the PaaS system. As described further below in connection with FIG. 3, the deployment component may invoke one or more hooks to build and prepare the source code for deployment. More particularly, for example, the deployment component can convert the source code into a build result and prepare the build result to be deployed as a deployment artifact. In one embodiment, a new container (e.g., a gear) can be created to host the source code. The deployment artifact can then be copied into the new container, which is later started for execution. In one embodiment, the container(s) that provide deployment functionality and/or other functionality for the application can be removed after successful execution of the deployment artifact in the new container. For example, as described below in connection with FIG. 3, a deployment component of the application 235a-b can run one or more hooks to build, prepare and distribute the source code.

Figure 3:
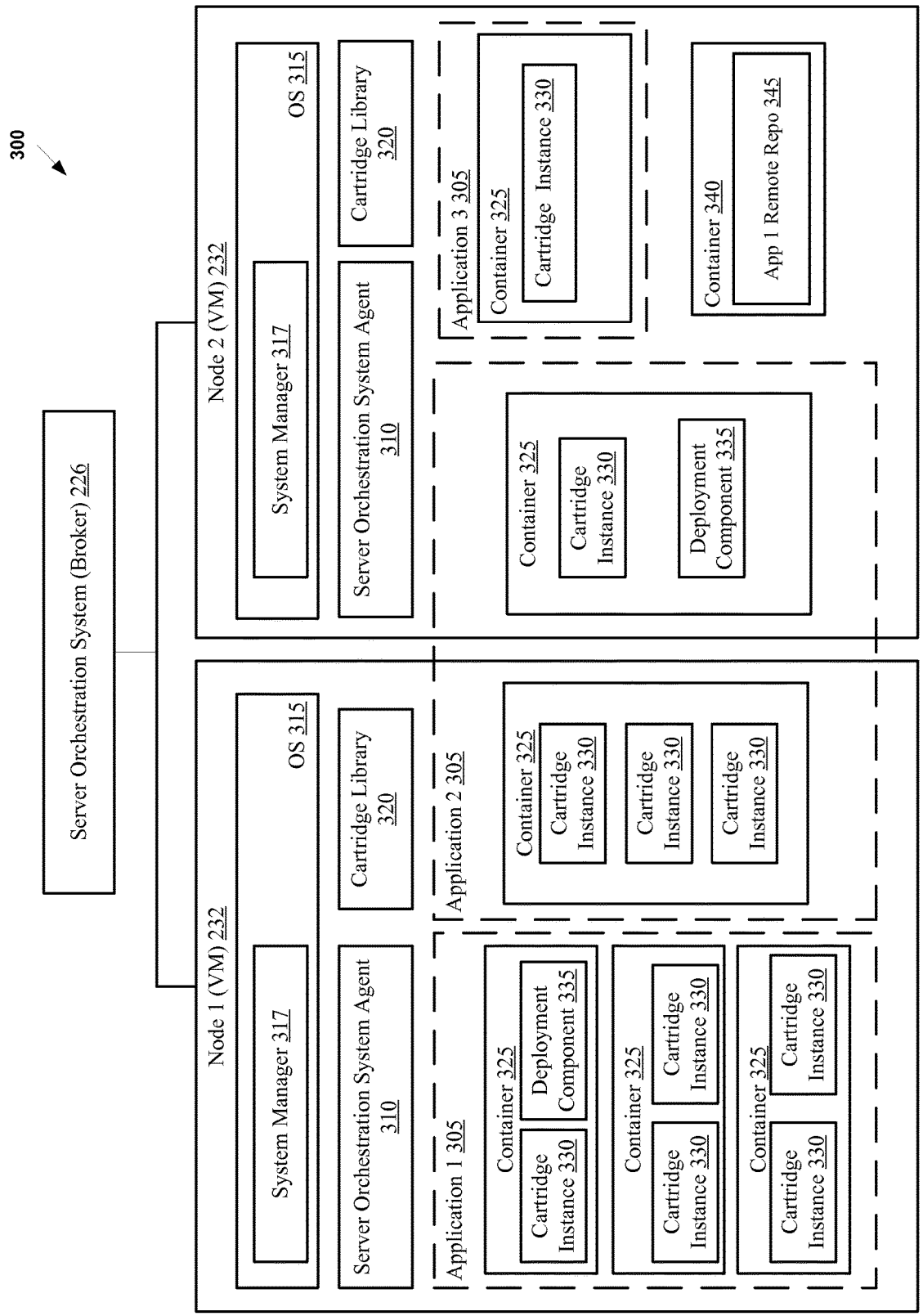
FIG. 3 is a block diagram depicting a communication infrastructure between a server orchestration system and a plurality of nodes according to embodiments of the disclosure.

FIG. 3 is a block diagram depicting a communication infrastructure 300 between a server orchestration system 226 and a plurality of nodes 232 according to embodiments of the disclosure. In one embodiment, server orchestration system 226 and nodes 232 are the same as their counterparts described with respect to FIG. 2. In one embodiment, each node 232 is implemented as a VM and has an operating system 315 that can execute applications 305 using the cartridge library 320 that are resident on the nodes 232. In one embodiment, applications 305 are the same as applications 235a-b described with respect to FIG. 2.

Each node 232 also includes a server orchestration system agent 310 to track and collect information about the node 232 and to perform management actions on the node 232. Thus, in one embodiment, using ETCD™ as the server orchestration system 226, the server orchestration system agent 310 can act as an ETCD™ server. The server orchestration system 226 then acts as the ETCD™ client that can send requests, queries, and commands to the ETCD™ server on node 232.

As previously mentioned, cartridges provide the underlying support software that implements the functionality of applications 305. In one embodiment, an application 305 may utilize one or more cartridge instances 330 that are run in one or more resource-constrained containers 325 on nodes 232. Cartridge library 320 provides an OS 315-based location, outside of all application containers 325, that acts as a source for cartridge instantiations 330 that provide functionality for an application 305. An application 305 may use more than one cartridge instance 330 as part of providing functionality for the application 305. One example of this is a JavaEE application that uses a JBoss™ AS7 cartridge with a supporting MySQL™ database provided by a MySQL™ cartridge. Each cartridge instance may include a software repository that provides the particular functionality of the cartridge instance 330.

A container 325 is a resource-constrained process space on the node 232 to execute functionality of an application. In some embodiments, a container 325 is established by the node 232 with resource boundaries, including a limit and/or designation of the amount of memory, amount of storage, and security types and/or labels to be applied to any functions executed by the container 325. In one embodiment, containers 325 may be established using the Linux™ Containers (LXC) virtualization method. In further embodiments, containers may also be established using cgroups, SELinux™, and kernel namespaces, to name a few examples. In some embodiments, a container 325 may also be referred to as a gear.

In some embodiments, cartridges instances 330 for an application 305 may execute in containers 325 dispersed over more than one node 232, as shown with respect to application 2 305 illustrated in FIG. 3. In other embodiments, cartridge instances 330 for an application 305 may run in one or more containers 325 on the same node 232, as shown with respect to application 1 in FIG. 3.

In some embodiments, upon receiving a request to create an application from the master 226, a node 232 can create one or more containers 325 for the application. In one embodiment, the server orchestration system agent 310 receives a request from the server orchestration system master 226 to create a container 325 to run a type of cartridge that provides all or part of an application's functionality. When the server orchestration system agent 310 receives the request from the master 226, it establishes a secure container 325 associated with a unique local user identifier on the node 232. In addition, the server orchestration system agent 310 establishes the resources boundaries associated with the created container 325 by creating directory and file system locations associated with the container 325 (in view of a type of container the master 226 instructed the node 232 to create) and creating a control group associated with the container 325.

Security policies for the container 325 are also established by creating and applying security labeling and types to the container 325 that fence off the container 325 from other containers 325 on the node and to prevent the container 325 from accessing the underlying system resources of the node 232. Once a secure and resource-constrained container 325 is established, the server orchestration system agent 310 invokes the cartridge library 320 in order to create a cartridge instance 330 of the type of cartridge indicated in the request from the master 226.

In some embodiments, a system manager 317 provides process management for one or more applications executing on the node 232. For example, the system manager 317 can facilitate creation and/or management of containers for an application running on the node 232. As another example, the system manager 317 can log, audit, manager, and/or monitor status of a container associated with an application (e.g., the container 340, the container 325, etc.). In one embodiment, the system manger 317 can be implemented using the systemd daemon.

In some embodiments, the system manager 317 can instruct server orchestration system agent 310 to create a container to host a remote SCM repository and/or to implement source code management functionality for the application 305 (e.g., a SCM container). For example, the server orchestration system agent 320 can install an image of an executable application for implementing source code management functionality (e.g., an image of Git executables, an image of a Git repository, etc.). In one embodiment, as shown in FIG. 3, the container 340 and the container 325 can reside on multiple nodes 232. The container 340 can host a remote SCM repository 345 to store code of the application 305 for editing and/or for execution on the node 232.

In one embodiment, the system manager 317 can instruct the server orchestration system agent 310 to create the container 340 in response to receiving a request to create an application on the PaaS system 220. In another embodiment, the system manager 317 can instruct the server orchestration system agent 310 to create and/or to instantiate the container 340 in response to receiving a request to deploy source code for the application 305 (e.g., via a "push" operation).

In some embodiments, the server orchestration system agent 310 can create networking links for multiple containers across multiple nodes of the PaaS system. For example, the server orchestration system agent 310 can link the container 340 that hosts the SCM repository 345 on the node 2 to one or more container(s) 325 associated with application 1 305 that are run on the node 1. In one embodiment, the server orchestration system agent 310 can associate a remote identifier of the container 340 (e.g., a remote Internet Protocol (IP) address) with an identifier that can be recognized by the containers 325 as a local identifier (e.g., a local IP address). In one embodiment, the local identifier can include identifying information of the node associated with the container 325, the application 305 associated with the container 325, and/or the container(s) 325, such as a namespace, an IP address, etc. In some embodiments, communications by a container 325 on the node 1 232 addressed to the local identifier can be forwarded to the container 340 by mapping the local identifier to the remote identifier.

In one embodiment, the container 340 can be linked to the container(s) 325 using Open vSwitch (OVS), iptables, nftables, and/or any other suitable mechanism that can be used to link containers running on multiple nodes. In one embodiment, local net routing and/or IP forwarding functionality can be enabled and utilized to create networking links for containers running on the nodes 232.

In some embodiments, upon receiving source code of the application 305 provided (e.g., "pushed") by a local SCM repository associated with the application 305, the container 340 can update the remote SCM repository 345 using the received source code and invoke one or more containers 325 to deploy the source code. For example, the container 340 invokes a deployment component 335 to run one or more hooks to deploy the received source code.

In one embodiment, the deployment component 335 can run one or more hooks to build and deploy the source code. For example, the deployment component 335 calls into cartridge hooks associated with the cartridges 330. The cartridges 330 can then execute cartridge-specific build logic and deployment logic to build and deploy the received source code. In a more particular example, in response to receiving source code of a new application, the deployment component 335 can invoke cartridge library 320 to run a number of hooks to create and commit an image for the new application and start one or more new containers from the image. In another more particular example, in response to receiving changes to source code of a currently-running application, the deployment component 335 invokes cartridge library 320 to run a number of hooks to build and commit an image for the currently running application with the code changes and start one or more new containers from the image. In one embodiment, a hook is code that handles intercepted functions, events, or messages passed between software components.

In one embodiment, the build logic can execute a build process to convert the source code into a build result, such as a deployable image. For example, the build logic can create and commit an image in view of the source code. In some embodiments, the deployment component 335 may push the image to a registry of the application 305. A build result may include the source code and/or anything produced by the application's build process (e.g. a .war file). The build result may represent the state of the repositories 233a, 233b, and the dependencies on the container 325 after the build has been executed.

In one embodiment, preparing a build result for deployment involves the execution of a prepare platform action and a user-defined prepare action hook (if one exists). If the prepare platform action is passed a file as an input, it extracts the file into the specified deployment directory. The prepare user action hook is placed in the cartridge library 320 where users may execute custom code to modify the build result prior to its distribution to the application's containers. An example use case for the prepare action hook is using it to download environment-specific files that do not belong in the application's repository to the build result directory. In another example, a use case for the prepare action hook is creating a unique identifier and a symlink for the unique identifier. A symlink is a special type of file that contains a reference to another file or directory. In one embodiment, the build result may be compressed to minimize disk space usage.

A build result that has been prepared for distribution is a deployment artifact (e.g., a deployable image). In one embodiment, the deployment artifact can be associated with a unique identifier that is created by the prepare platform action after the user-defined prepare action hook has been executed. Once the deployment artifact has been created, it may be used to create one or more new containers for the application 305.

In one embodiment, the deployment logic may create one or more new containers from the deployment artifact (e.g., the deployable image) to deploy the received source code on the PaaS. The application 305 may have one or more containers before the new containers are created, such as one or more containers 325 as discussed above (e.g., the "old container(s)"). The old container(s) may be removed upon successful creation and/or start of the new containers.

In one embodiment, the deployment component 335 is a container (e.g., gear) for the application 305. The deployment component 335 can implement deployment functionality across a variety of different cartridges. As a result, an end user of the PaaS platform does not have to be aware of or implement deployment functionality, such as a deployment component 335, in each cartridge instance type that application 305 may use. Instead, the deployment component 335 and the PaaS platform 200 can perform tasks related to deployment of source code of the application 305 (e.g., source code of a new application, changes to source code of a running application, etc.).

FIG. 4 is a flow diagram illustrating a method 400 for source code management for a PaaS system utilizing a container to host a remote SCM repository according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by a processing device (e.g. a processing device 602 of FIG. 6) executing one or more nodes 232 of a PaaS system as described in connection with FIGS. 2 and 3.

Method 400 begins at block 410 where the processing device receives a request to deploy source code of an application on a PaaS system. In one embodiment, the request can be received via a "push" operation. In one embodiment, the request can include the source code to be deployed on the PaaS system, such as source code of a new application, changes to source code of a running application, etc. In one embodiment, the request can be and/or include a user request to create the application on the PaaS system. The request may be provided to the PaaS system via command line tools or by communicating directly with an API of the master.

At block 420, the processing device can create a first container to host a remote SCM repository for the application. For example, a container 325 as described in connection with FIG. 3 can be created to host a remote SCM repository (e.g., the remote repository 241a-b, 345 of FIGS. 2 and 3). In one embodiment, the first container can be created in response to receiving the user request to deploy source code of the application. In another embodiment, the first container can be created in response to receiving a request to create the application on the PaaS system.

At block 430, the processing device can create a second container to provide deployment functionality and any other functionality for the application. For example, a container 325 as described above in connection with FIG. 3 can be created on a node of the PaaS system. In some embodiments, the second container can include one or more cartridges that provide a framework and/or other functionality (e.g., deployment functionality, database functionality, etc.) for the application and/or a portion of the application. In one embodiment, the processing device can create one or more networking links to facilitate communication between the first container and the second container. The first container and the second container can reside on multiple nodes of the PaaS system in some embodiments.

At 440, the processing device can deploy the source code on the PaaS system. For example, the processing device can perform one or more of blocks 441-445 to deploy the source code.

At block 441, the processing device can implement deployment functionality to convert the source code into a build result prepared for distribution as a deployment artifact. For example, as discussed above in connection with FIG. 3, the processing device can invoke one or more hooks to convert the source code into the build result and prepare the build result for distribution as the deployment artifact. More particularly, for example, the processing device can create an image from the source code and commit the image.

At block 443, the processing device can create a third container to host the source code. For example, the processing device can create the third container using the image. At block 445, the processing device can remove the second container. In some embodiments, the processing device can remove the second container upon creating and/or starting the third container from the image. Additionally, the processing device can remove one or more previously created application containers (e.g., "old containers" that were previously created for the application prior to the creation of the third container).

FIG. 5 is a flow diagram illustrating a method 500 for source code management for a PaaS system utilizing a remote SCM repository hosted by a source code management platform according to another embodiment of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by a processing device (e.g. a processing device 602 of FIG. 6) executing one or more nodes 232 of a PaaS system as described in connection with FIGS. 2 and 3.

Method 500 begins at block 510 where the processing device receives an indication that a SCM platform has been designated by a user to host a remote SCM repository for an application running on a PaaS system. The indication can include identifying information of the SCM platform and/or the remote SCM repository. In one embodiment, the source code management platform can be implemented on a computer system that is external to the PaaS system, such as the SCM platform 140 as described above in connection with FIGS. 1 and 2.

At block 520, the processing device can associate the SCM platform and/or the remote SCM repository with the application. For example, the processing device can store identifying information of the SCM platform and/or the remote SCM repository (e.g., a URL) in association with the application. As another example, the processing device can cause a post-receive hook to be set up at the remote SCM repository to invoke the processing device to deploy source code of the application received at the remote SCM repository.

At block 530, the processing device can receive a request to deploy source code of the application on the PaaS system. In one embodiment, the request can be received via a "push" operation from the remote SCM repository. In one embodiment, the request can include the source code to be deployed on the PaaS system, such as source code of a new application, changes to source code of a running application, etc. The request may be provided to the PaaS system via command line tools or by communicating directly with application interface (API) of the master.

At block 540, the processing device can deploy the source code. For example, as described above in connection with FIGS. 2 and 3, a deployment component of the application 235a-b can run one or more hooks to build, prepare and distribute the source code. More particularly, for example, the processing device can implement build and deployment functionality to convert the source code into a build result prepared for distribution as a deployment artifact, such as a deployable image. The processing device can create one or more new containers for the application using the image. In some embodiments, the source code can be deployed by performing one or more operations described above in connection with blocks 441-445 of FIG. 4.

Figure 6:
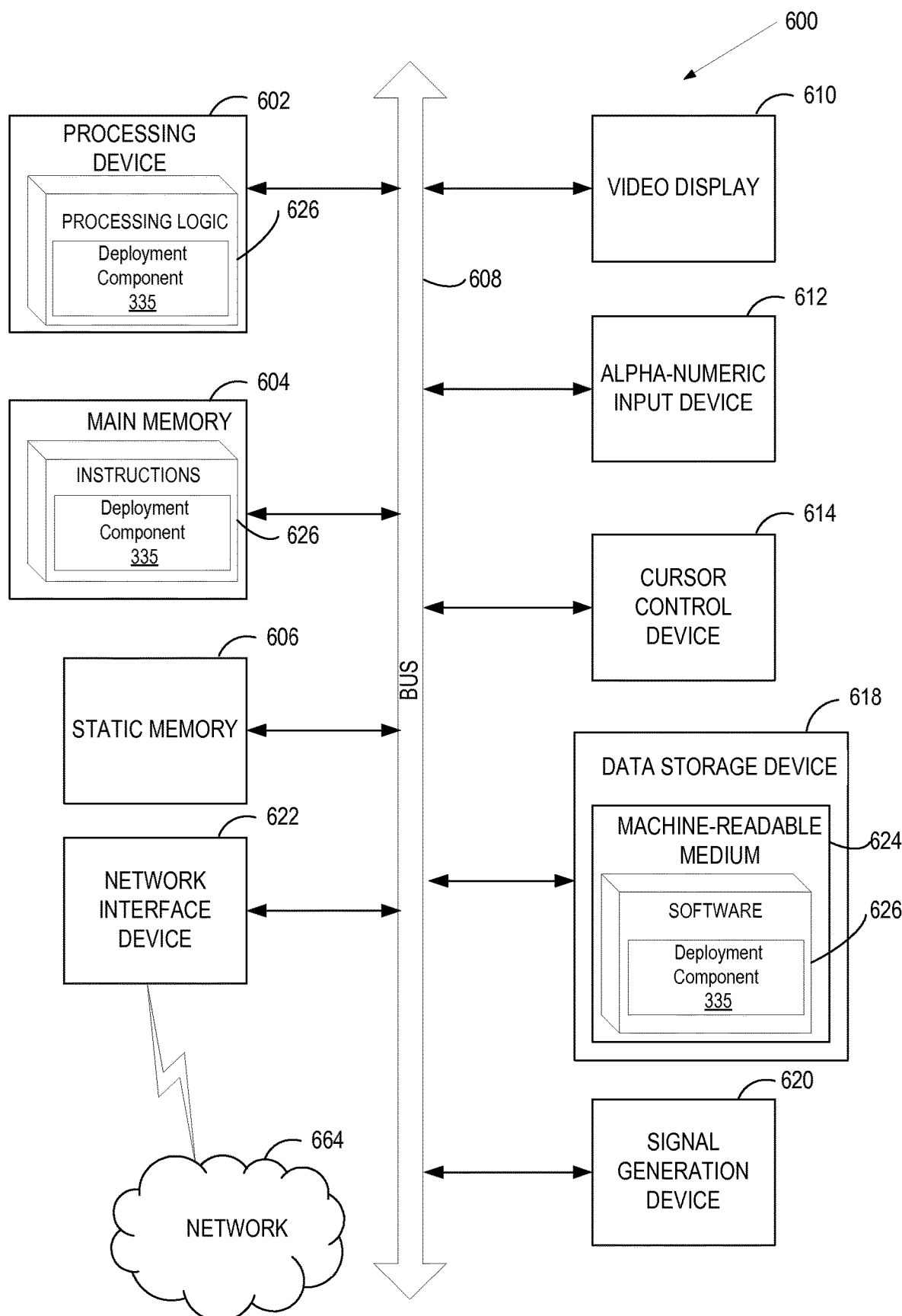
FIG. 6 illustrates a block diagram of one embodiment of a computer system.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 includes a processing device 602 (e.g., a hardware processor, CPU, etc.), a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 608.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is to execute the processing logic 626 for performing the operations and steps discussed herein.

The computer system 600 may further include a network interface device 622 communicably coupled to a network 664. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to perform source code management for a multi-tenant PaaS system, such as the deployment component 335 and/or the server orchestration system agent 310 as described with respect to FIG. 3, and/or a software library containing methods that call the above applications. While the machine-accessible storage medium 624 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "activating," "providing," "executing," "removing," "starting" "storing," "symlinking," "rolling back," "linking," "managing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
   receiving, from a client device of a user associated with an application, an indication that a source code management platform has been designated to host a first remote source code management repository for the application running on a platform-as-a-service (PaaS) system, wherein the indication is in view of a modification to the application and comprises identifying information associated with the source code management platform;
   associating the first remote source code management repository with the application running on the PaaS system;
   creating, by a processing device of the PaaS system, a first container to host the first source code management repository for the application running on the PaaS system, the first container comprising a resource-constrained processing space of a first node of the PaaS system to execute functionality of the application, wherein creating the first container comprises deploying an image of an executable application to implement source code management functionality;
   receiving, from a local source code management repository on a client layer of the PaaS system at the first container, a first source code associated with the application;
   in response to receiving the first source code, creating, by the processing device, a second container to provide deployment functionality for the application, the second container comprising a resource-constrained processing space of a second node of the PaaS system to execute functionality of the application;
   creating a third container;
   deploying, by the processing device, an image of the application in the third container in view of the deployment functionality for the application in the second container by converting the first source code associated with the application into a build result, wherein the build result is prepared for distribution as a deployment artifact, and wherein the creating of the third container is in view of the deployment artifact; and
   responsive to deploying the image of the application in the third container, removing the second container.

2. The method of claim 1, wherein the first node is different from the second node.

3. The method of claim 1, wherein the deployment artifact comprises an image created from the first source code.

4. The method of claim 1, further comprising:
   receiving a second source code from a second source code management repository that is external to the PaaS; and
   deploying the second source code on the PaaS system using the second container.

5. The method of claim 1, further comprising executing, by the processing device, functionality of a plurality of applications on the first node of the PaaS system, wherein the plurality of applications are associated with a plurality of users.

6. The method of claim 1, wherein receiving the indication that the source code management platform has been designated to host the first remote source code management repository for the application running on the PaaS system by the user associated with the application comprises:
   providing a graphical user interface comprising a plurality of systems to host the first source code management repository, wherein the plurality of systems comprises the source code management platform; and
   receiving, via the graphical user interface, a selection of the source code management platform by the user associated with the application running on the PaaS system.

7. A system, comprising:
   a memory; and
   a processing device communicably coupled to the memory to:
      receive, from a client device of a user associated with an application, an indication that a source code management platform has been designated to host a first remote source code management repository for the application running on a platform-as-a-service (PaaS) system, wherein the indication is in view of a modification to the application and comprises identifying information associated with the source code management platform;
      associate the first remote source code management repository with the application running on the PaaS system;
      create a first container to host the first source code management repository for an application running on the PaaS system, wherein the first container comprises a resource-constrained processing space of a first node of the PaaS system to execute functionality of the application, wherein creating the first container comprises deploying an image of an executable application to implement source code management functionality;
      receive, from a local source code management repository on a client layer of the PaaS system at the first container, a first source code associated with the application;

in response to receiving the first source code, create a second container to provide deployment functionality for the application, the second container comprising a resource-constrained processing space of a second node of the PaaS system to execute functionality of the application;

create a third container;

deploy an image of the application in the third container in view of the deployment functionality for the application in the second container by converting the first source code associated with the application into a build result, wherein the build result is prepared for distribution as a deployment artifact, and wherein the creating of the third container is in view of the deployment artifact; and responsive to deploying the image of the application in the third container, remove the second container.

8. The system of claim 7, wherein the first node is different from the second node.

9. The system of claim 7, wherein the deployment artifact comprises an image created from the first source code.

10. The system of claim 7, wherein the processing device is further to:

receive a second source code from a second source code management repository that is external to the PaaS; and deploy the second source code using the second container.

11. The system of claim 7, wherein the processing device is further to execute functionality of a plurality of applications on the first node of the PaaS system, wherein the plurality of applications are associated with a plurality of users.

12. A non-transitory machine-readable storage medium including instructions that, when accessed by a processing device, cause the processing device to:

receive, from a client device of a user associated with an application, an indication that a source code management platform has been designated to host a first remote source code management repository for the application running on a platform-as-a-service (PaaS) system, wherein the indication is in view of a modification to the application and comprises identifying information associated with the source code management platform;

associate the first remote source code management repository with the application running on the PaaS system;

create, by the processing device, a first container to host the first source code management repository for an application running on the PaaS system, the first container comprising a resource-constrained processing space of a first node of the PaaS system to execute functionality of the application, wherein creating the first container comprises deploying an image of an executable application to implement source code management functionality;

receive, from a local source code management repository on a client layer of the PaaS system at the first container, a first source code associated with the application; and in response to receiving the first source code, create a second container to provide deployment functionality for the application, the second container comprising a resource-constrained processing space of a second node of the PaaS system to execute functionality of the application;

create a third container;

deploy, by the processing device, an image of the application in the third container in view of the deployment functionality for the application in the second container by converting the first source code associated with the application into a build result, wherein the build result is prepared for distribution as a deployment artifact, and wherein the creating of the third container is in view of the deployment artifact; and responsive to deploying the image of the application in the third container, remove the second container.

13. The non-transitory machine-readable storage medium of claim 12, wherein the first node is different from the second node.

14. The non-transitory machine-readable storage medium of claim 12, wherein the deployment artifact comprises an image created from the first source code.

15. The non-transitory machine-readable storage medium of claim 12, wherein the processing device is further to:

receive a second source code from a second source code management repository that is external to the PaaS; and deploy the second source code using the second container.

* * * * *